United States Patent [19]

Bruening et al.

[11] Patent Number: 4,853,191

[45] Date of Patent: Aug. 1, 1989

[54] PROCESS FOR THE REMOVAL OF SULFUR-CONTAINING GASES

[75] Inventors: Wilhelm Bruening, Rio de Janeiro, Brazil; Rudolf Uchdorf, Krefeld; Alfred Mitschker, Odenthal-Holz, both of Fed. Rep. of Germany

[73] Assignee: Bayer Do Brasil S.A., Rio de Janeiro, Brazil

[21] Appl. No.: 159,147

[22] Filed: Feb. 25, 1988

[30] Foreign Application Priority Data

Mar. 1, 1987 [DE] Fed. Rep. of Germany ....... 3706619

[51] Int. Cl.$^4$ ................. C01B 11/16; C01B 31/20; C01B 17/00; B01J 8/00
[52] U.S. Cl. ..................... 423/226; 423/228; 423/229; 423/230; 423/242; 423/243; 423/244
[58] Field of Search ............... 423/226, 228, 229, 230, 423/242, 244, 243

[56] References Cited

U.S. PATENT DOCUMENTS

| | | | |
|---|---|---|---|
| 2,962,344 | 11/1960 | Kurmeier | 423/210 |
| 4,196,175 | 4/1980 | Jensen | 423/519 |
| 4,283,373 | 8/1981 | Frech et al. | 423/243 |
| 4,537,753 | 8/1985 | Wagner et al. | 423/229 |
| 4,737,166 | 4/1988 | Matson et al. | 423/229 |

FOREIGN PATENT DOCUMENTS 2453549 7/1975 Fed. Rep. of Germany.
2533103 2/1976 Fed. Rep. of Germany.

OTHER PUBLICATIONS

Ind. Eng. Chem. Prod. Res. Develop., vol. 12, No. 4, 1973, 288–293.

*Primary Examiner*—John Doll
*Assistant Examiner*—Lori S. Freeman
*Attorney, Agent, or Firm*—Sprung, Horn, Kramer & Woods

[57] ABSTRACT

A process for the selective removal of sulfur-containing gases from industrial gases or waste gases by treatment of gases with basic substances, characterized in that the basic substances are carrier materials containing tertiary amino groups corresponding to the following formula:

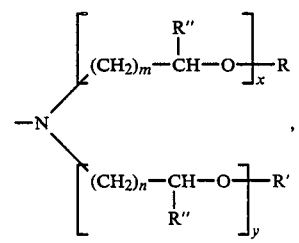

in which
m and n individually are 1 or 2,
x and y individually are from 0 to 10 and preferably 0 to 2,
R and R' individually are hydrogen or alkyl and
R" is hydrogen or methyl.

14 Claims, 1 Drawing Sheet

PROCESS FOR THE REMOVAL OF SULFUR-CONTAINING GASES

BACKGROUND OF THE INVENTION

1. Field of the Invention

This invention relates to a process for the selective removal of sulfur-containing gases from industrial gases or waste gases by treatment with basic substances.

2. Background Information

Processes for the removal of sulfur-containing gases from industrial gases or waste gases are already known. Thus, DE-A No. 3 004 757 describes the removal of hydrogen sulfide from industrial gases using aqueous solutions of alkali metal hydroxides. According to DE-A No. 3 236 600 and DE-A No. 3 236 601, carbon dioxide and hydrogen sulfide are removed from industrial gas mixtures by scrubbing with an aqueous solution of methyl diethanolamine. DE-A No. 3 027 220 is concerned with the removal of hydrogen sulfide from industrial gases with aqueous alkali solutions.

In addition, DE-A No. 3 427 133, DE-A No. 3 427 134 and EP-A No. 173 908 describe processes for the removal of $CO_2$ and/or $H_2S$ in which the removal is carried out in absorption liquids contaiing alkanolamine. According to DE-A No. 3 429 979, the acidic and/or sulfur-containing gases are removed in aqueous solutions containing bases in the presence of a basic ion exchanger containing incorporated tertiary or quaternary nitrogen atoms.

In special cases, the object may be to remove only sulfur-containing gases from gas mixtures. The object of the present invention is to provide such a process.

A process for the selective removal of sulfur-containing gases which is surprisingly easy to carry out and, in addition, gives very good results has now been found. In this process, carrier materials containing tertiary amino groups are used as basic substances.

SUMMARY OF THE INVENTION

The present invention relates to a process for the selective removal of sulfur-containing gases from industrial gases or waste gases by treatment of the gases with basic substances, characterized in that the basic substances are carrier materials containing tertiary amino groups corresponding to the following general formula

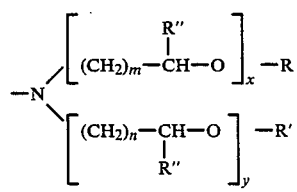

in which
  m and n may each assume values of 1 or 2,
  x and y may each assume values of from 1 to 10 and preferably
  of from 1 to 2 and
  R and R' are hydrogen or alkyl and
  R" is hydrogen or methyl.

DETAILED DESCRIPTION OF THE INVENTION

Figure 1:
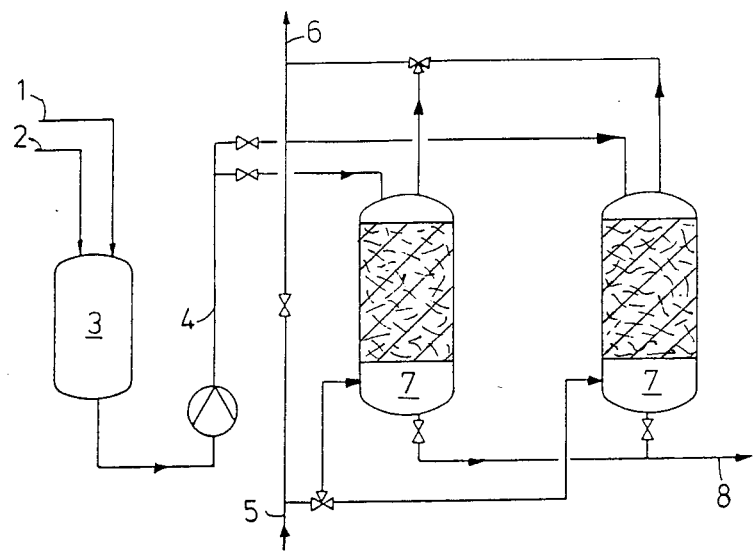
FIG. 1 is a schematic diagram of a process according to the invention.

Both inorganic and organic substances are suitable as carrier materials for the purposes of the invention. In one preferred embodiment of the process according to the invention, the carrier materials are polymerization resins. These polymerization resins may be copolymers of polymerizable vinyl compounds which contain the tertiary amino groups according to the invention, either in the molecule itself or after corresponding functionalization.

Polymerization resins crosslinked with polyvinyl compounds are particularly suitable. Styrene, chlorostyrenes, alkyl styrenes, chloromethyl styrenes (meth)acrylates ($C_1$-$C_6$), (meth)acrylamides or (meth)acrylamides based on polyaminde, glycidyl methacrylate and vinyl glycidyl ether are examples of monovinyl compounds. Suitable polyvinyl compounds are, for example, DVB (divinylbenzene), TVB (trivinylbenzene), ethylene glycol dimethacrylate, methylene bisacrylamide, divinyl ethylene urea, 1,7-octadiene, 1,5-hexadiene and triallyl cyanurate. These resins are functionalized by methods known per se.

Ion exchangers or their intermediates of the type mentioned above are known. They and their production are described, for example, in F. Helfferich, Ionenaustauscher, Vol. 1, 1959, pages 10 to 106 and in Ullmanns Enzyklopadie der techn. Chemie, 4th Edition, Vol. 13, 1977, pages 292 to 309. Polyamines, such as triethylenetetramine for example, or suitable hydrazine derivatives may also be used for functionalization.

Other preferred carrier materials are condensation resins containing the tertiary amino groups according to the invention.

The production of such resins is known. They are obtained, for example, by reaction of aliphatic and/or aromatic amines with epichlorohydrin or formaldehyde. Suitable aliphatic amines are, for example, polyalkylene polyamines, such as diethylenetriamine, triethylenetetramine, while a suitable aromatic amine is, for example, m-phenylenediamine.

The ethanolamine or propanolamine groups according to the invention may be obtained with advantage by reaction of the corresponding resins with ethylene oxide or propylene oxide.

The process according to the invention is suitable for the removal of sulfur-containing gases. In the context of the invention, sulfur-containing gases are in particular hydrogen sulfide, carbon disulfide, carbon oxysulfide and sulfur dioxide.

In one particularly preferred embodiment of the process according to the invention, the sulfur-containing gas is $SO_2$. The sulfur-containing gases may be selectively separated from other gases by the process according to the invention. Thus, sulfur-containing gases may be removed from gases of high $CO_2$ content.

Applications are in the desulfurization of domestic fuel, in the removal of $SO_2$ in the Clauss process, in the desulfurization of the waste gases from power stations, sulfuric acid plants, refineries and calcining processes.

In the process according to the invention, the gases or waste gases to be treated are brought into contact with the carrier materials according to the invention. Since the gases to be purified generally contain sufficient moisture, the carrier materials according to the invention may be used as such, i.e., without further pretreatment, with their particular water content, i.e., not in an aqueous medium as in known processes. Where the gases are too dry, it is sufficient to moisten them by known methods or even to spray the contact layer itself with water.

The quantity in which the carrier materials are used is governed by the concentration of the sulfur-containing gases in the industrial gases to be treated. The carrier materials are preferably used in quantities of from 5 to 500 l and preferably in quantities of from 10 to 50 l per $Nm^3/h$ gas to be treated. It is also possible in principle to use the carrier materials in larger or smaller quantities.

The removal of the sulfur-containing gases is preferably carried out at room temperature (approximately 10° to 30° C.). Under the described conditions, it takes from 2 to 7 days for the resin to be completely saturated. In one particularly preferred embodiment of the process according to the invention, the carrier materials are regenerated after their saturation.

Depending on the particular conditions prevailing, the regeneration process may be carried out with advantage by any of the three methods described as follows. One preferred method is characterized in that the regeneration process is carried out at room temperature by (a) treatment of the carrier materials with HCl and subsequent removal of the unused HCl by washing with water (b) and activation with sodium hydroxide solution, the excess sodium hydroxide solution being subsequently removed with water.

The HCl used preferably has a concentration of from 3 to 10%, although even where 36% HCl is used the carrier materials generally suffer no damage. The reactivation is carried out with sodium hydroxide solution having concentration of 3 to 50% and preferably 5 to 10%.

In the two alternative methods described below, the regeneration process is carried out at elevated temperature using sodium hydroxide solution or steam. In other words, no additional chlorides are produced. The regeneration with sodium hydroxide is carried out at temperatures in the range from 120° to 200° C. and preferably in the range from 130 to 160° C. The sodium hydroxide preferably has a concentration of from 5 to 30%.

Where the regeneration is carried out with steam, temperatures of from 180° to 235° C. are preferred. The pressure of the steam is between 9 and 30 bar.

FIG. 1 illustrates one possibility for carrying out the process according to the invention. In FIG. 1:

(1)=NaOH
(2)=$H_2O$
(3)=regenerating agent reservoir
(4)=gas to be treated
(5)=gas to be treated
(6)=treated gas
(7)=absorption towers
(8)=spent regenerating agent The gas to be treated (5) is passed through one of two absorption towers (7) filled with carrier materials which it leaves as treated gas (6). Sodium hydroxide (1) and water (2) are mixed in the regenerating agent reservoir (3). The stream (4) of regenerating agent is passed through the absorption tower (7) in which the carrier materials are already saturated. The spent regenerating agent (8) is removed from the system and may then be reprocessed.

The treated gas removed from the system through the pipe (6) has a greatly reduced content of sulfur-containing impurities compared with the untreated gas. Thus, it is possible for example almost quantitatively to reduce (>98%) the sulfur content of $CO_2/SO_2$ gas mixtures having an $SO_2$ concentration of from 2500 to 13 500 ppm.

The process according to the invention is not of course confined in its practical application to the use of the apparatus shown purely by way of example in the drawing.

The following Examples are intended to illustrate the invention without limiting it in any way.

EXAMPLE 1

Production of the ion exchanger

A styrene/divinylbenzene copolymer resin provided with aminobenzyl groups (type MP 64 ZII) was reacted with 2.2 moles ehthylene oxide

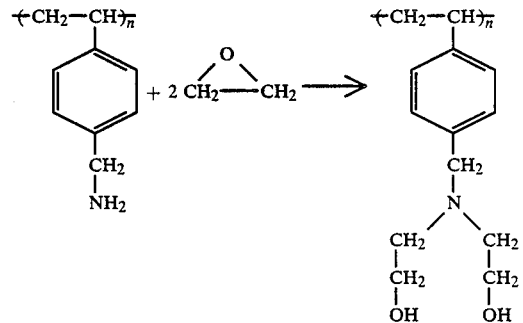

The reaction took place at 80° C. in aqueous medium, in the absence of a catalyst and using a 10% excess of ethylene oxide. According to IR spectra, the reaction was quantitative.

The final resin was distinguished from the intermediate product (amine odor) by complete odorlessness. Whereas the intermediate product became distinctly darker at temperatures around 120° C., the end product retained its originally light color. Both properties are the result of the high chemical stability of the functional N,N-bis-(β-hydroxyethyl)-benzylamino group.

EXAMPLE 2

Adsorption of $SO_2$ from $CO_2$:

100 ml of the moist resin produced in accordance with Example 1 were introduced into a reactor in the form of a fine steel tube. The $CO_2/SO_2$ gas mixture was prepared in a 60 liter pressure bottle, a concentration of 1000 to 1500 ppm being adjusted. Analytical control was by iodometric titration using a Mettler Memotitrator. The gas mixture was applied to the resin from the pressure bottle at 40 l/hour via rotameters.

To check the effectiveness of the resin, the gas issuing from the reactor was passed through an iodine/potassium iodide solution which was checked for its content by titration at certain time intervals.

Figure 2:
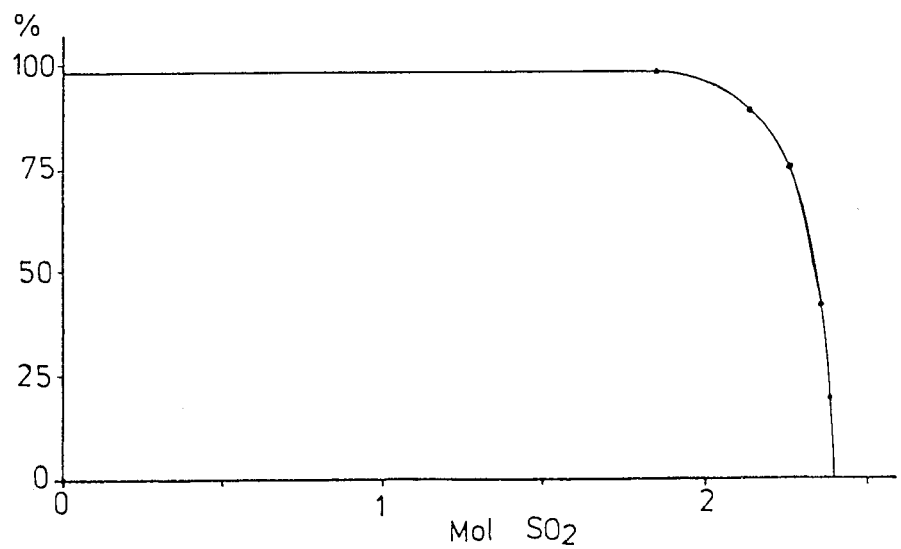
FIG. 2 is a graph of relative $SO_2$ adsorption a resin vs. moles $SO_2$ in tretreated gas mixture.

The result of the test is shown in the form of a graph in FIG. 2. The relative SO₂ adsorption of the resin was based on a volume of 1000 ml and was plotted against the quantity of SO$_2$ (moles) present in the treated gas mixture.

The curve shows that, initially, the adsorption of SO$_2$ is substantially quantitative, the SO$_2$ beginning to break through at 1.85 moles. The rapid fall from almost 100% at 1.85 moles to zero at 2.4 moles demonstrates the high efficiency of the resin.

The resin thus absorbed 118.4 g SO$_2$, corresponding to approximately 17% of its own weight (1 liter=0.7 kg), before the breakthrough.

The resin saturated with SO$_2$ may be effectively regenerated with 5 bed volumes of 4% sodium hydroxide at room temperature. The resin thus regenerated showed the same adsorption properties as the freshly prepared resin for the same load.

EXAMPLE 3

In the test arrangement described in Example 2, the gas mixtures shown in Table 1 were passed through 500 ml of the resin prepared in accordance with Example 1.

TABLE 1

| Duration | CO$_2$ stream | |
|---|---|---|
| [h] | [l/h] | ppm SO$_2$ |
| 31 | 42 | 2500 |
| 41 | 36 | 3600 |
| 27 | 42-56 | 5300 |
| 16 | 42 | 13500 |

Over the final 2 hours of treatment, the adsorption level fell from more than 98% of the SO$_2$ applied to 0%. Accordingly, approximately 1.50 moles SO$_2$ per liter resin were adsorbed in this test. The resin was regenerated with 5 bed volumes of 4% NaOH.

It will be appreciated that the instant specification and claims are set forth by way of illustration and not limitation, and that various modifications and changes may be made without departing from the spirit and scope of the present invention.

What is claimed is:

1. A process for the selective removal of sulfur-containing gases from industrial gases or waste gases comprising contacting the industrial gases or waste gases with a polymerization resin crosslinked with polyvinyl compounds, the resin containing tertiary amino groups corresponding to the following formula:

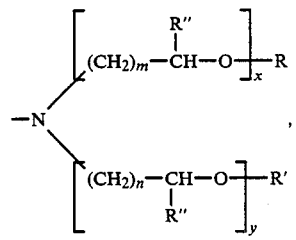

in which
m and n individually are 1 or 2,
x and y individually are from 0 to 10,
R and R' individually are hydrogen or alkyl and
R' is hydrogen or methyl.

2. A process according to claim 1, wherein x and y individually are 0 to 2.

3. A process according to claim 1, wherein the polyvinyl compounds are selected from the group consisting of DVB (Divinylbenzene), TVB (Trivinylbenzene), ethylene glycol dimethacrylate, methylene bisacrylamide, divinyl ethylene urea, 1,7-octadiene, 1,5-hexadiene and triallyl cyanurate.

4. A process according to claim 1, wherein the polymerization resins are copolymers of polymerizable vinyl compounds which contain the tertiary amino groups in the molecule itself or after corresponding functionalization.

5. A process according to claim 1, wherein the resin is a condensation resin.

6. A process according to claim 1, wherein the sulfur-containing gas is SO$_2$.

7. A process according to claim 1, wherein the resin is used in a quantity of from 5 to 500 l per Nm³/h gas to be treated.

8. A process according to claim 1, wherein the resin is used in a quantity of from 10 to 50 l per Nm³/h gas to be treated.

9. A process according to claim 1, wherein the removal is carried out at a temperature of 10 to 30° C.

10. A process according to claim 1, wherein the resin is regenerated after their saturation.

11. A process according to claim 10, wherein the regeneration is carried out at room temperature by
  (a) treatment of the resin is with HCl and subsequent removal of the unused HCl by washing with water, and
  (b) activation with sodium hydroxide solution, the excess sodium hydroxide solution being subsequently removed with water.

12. A process according to claim 11, wherein the regeneration with sodium hydroxide is carried out at temperatures of from 120° to 200° C..

13. A process according to claim 11, wherein the regeneration with sodium hydroxide is carried out at temperatures of from 130° to 160° C..

14. A process according to claim 11, wherein the regeneration is carried out with steam at temperatures of from 180 to 240° C..

* * * * *

UNITED STATES PATENT AND TRADEMARK OFFICE
CERTIFICATE OF CORRECTION

PATENT NO. : 4,853,191

DATED : August 1, 1989

INVENTOR(S) : Bruening et al.

It is certified that error appears in the above-identified patent and that said Letters Patent is hereby corrected as shown below:

| | |
|---|---|
| Col. 1, line 27 | Delete " contaiing " and substitute -- containing -- |
| Col. 3, line 62 | After " (4)=" delete " gas to be treated " and substitute -- stream of regenerating agent -- |
| Col. 6, line 17 | Delete " R' " and substitute -- R" -- |
| Col. 6, line 47 | After " resin " delete " is " |

Signed and Sealed this

Twenty-seventh Day of November, 1990

Attest:

HARRY F. MANBECK, JR.

*Attesting Officer*　　　　　*Commissioner of Patents and Trademarks*